(12) United States Patent
Gomi

(10) Patent No.: US 12,552,252 B2
(45) Date of Patent: Feb. 17, 2026

(54) INFORMATION PROCESSING DEVICE, VEHICLE, INFORMATION PROCESSING METHOD, AND NON-TRANSITORY STORAGE MEDIUM CAPABLE OF DISPLAY EXPECTED PASSAGE PATHS OF TIRES OF VEHICLE

(71) Applicant: TOYOTA JIDOSHA KABUSHIKI KAISHA, Toyota (JP)

(72) Inventor: Toshiyuki Gomi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/985,382

(22) Filed: Dec. 18, 2024

(65) Prior Publication Data

US 2025/0249744 A1   Aug. 7, 2025

(30) Foreign Application Priority Data

Feb. 5, 2024  (JP) .................................. 2024-015969

(51) Int. Cl.
*B60K 35/235*   (2024.01)
*G06F 3/01*   (2006.01)

(52) U.S. Cl.
CPC ............ *B60K 35/235* (2024.01); *G06F 3/012* (2013.01); *B60K 2360/741* (2024.01)

(58) Field of Classification Search
CPC . B60K 35/235; B60K 2360/741; G06F 3/012; G06V 20/58; B60W 30/08; B60W 50/023; G08G 1/0145; G08G 1/0112
See application file for complete search history.

(56) References Cited

U.S. PATENT DOCUMENTS

| | | | |
|---|---|---|---|
| 9,487,139 B1* | 11/2016 | Ishida | B60W 30/08 |
| 2012/0078572 A1* | 3/2012 | Bando | G08G 1/0112 |
| | | | 702/150 |
| 2019/0286134 A1* | 9/2019 | Niesen | B60W 50/023 |
| 2022/0281456 A1* | 9/2022 | Giovanardi | G06V 20/58 |
| 2022/0324421 A1* | 10/2022 | Giovanardi | G08G 1/0145 |

FOREIGN PATENT DOCUMENTS

JP   2021-086559 A   6/2021

* cited by examiner

*Primary Examiner* — Richard J Hong
(74) *Attorney, Agent, or Firm* — Oliff PLC

(57) ABSTRACT

The present disclosure provides an information processing device. The information processing device disclosed herein includes a display control unit that causes a display unit disposed in a field-of-view region of a driver that drives a vehicle to display visual information including expected passage paths of two or more tires of the vehicle.

15 Claims, 4 Drawing Sheets

INFORMATION PROCESSING DEVICE, VEHICLE, INFORMATION PROCESSING METHOD, AND NON-TRANSITORY STORAGE MEDIUM CAPABLE OF DISPLAY EXPECTED PASSAGE PATHS OF TIRES OF VEHICLE

CROSS-REFERENCE TO RELATED APPLICATION

This application claims priority to Japanese Patent Application No. 2024-015969 filed on Feb. 5, 2024, incorporated herein by reference in its entirety.

BACKGROUND

1. Technical Field

The present disclosure relates to an information processing device, a vehicle, an information processing method, and a non-transitory storage medium.

2. Description of Related Art

Drivers that are not good at driving a vehicle and drivers that are not accustomed to driving often feel anxious about passing through a narrow road and passing by an oncoming vehicle. In consideration of this point, there have conventionally been proposed several drive support techniques that resolve or reduce the anxiety of drivers.

For example, Japanese Unexamined Patent Application Publication No. 2021-086559 (JP 2021-086559 A) describes a technique that makes it easier for a driver to grasp the width of his/her vehicle by projecting the width of the vehicle onto a head-up display.

SUMMARY

According to JP 2021-086559 A, the driver can accurately grasp the width of his/her vehicle, which helps the driver smoothly passing through a narrow road and passing by an oncoming vehicle. When the driver encounters an obstacle on the road and wants to pass the obstacle by letting the obstacle pass under the vehicle body, or wants to avoid running onto a side road, etc., or running into a gutter, etc., however, simply displaying the vehicle width does not make it easy to drive smoothly. Thus, there is still room for further improvement in drive support technologies for drivers.

The present disclosure provides an information processing device, a vehicle, an information processing method, and a non-transitory storage medium capable of supporting smooth drive by a driver.

An aspect of the present disclosure provides an information processing device including a display control unit configured to cause a display unit disposed in a field-of-view region of a driver that drives a vehicle to display visual information including expected passage paths of two or more tires of the vehicle.

With the above information processing device, the expected passage paths of the tires can be displayed on the display unit, helping the driver grasp the position of the tire of the vehicle.

In the above information processing device, the display control unit may be configured to cause the display unit to display, as the visual information, the expected passage paths specified based on information about a steering angle of the vehicle.

With the above information processing device, the rate of curve of the expected passage paths can be calculated from the steering angle, making it possible to display the expected passage paths with high precision.

In the above information processing device, the visual information may further include information about widths of the two or more tires.

With the above information processing device, it is possible to display the expected passage paths according to the widths of the tires, helping the driver grasp the positions and the widths of the tires.

In the above information processing device, the display control unit may be configured to control a position of display of the visual information on the display unit based on at least one of a head position and a viewpoint of the driver.

With the above information processing device, it is possible to suppress the occurrence of deviation in display of the expected passage paths, etc., due to variations in the head position or the viewpoint of the driver.

In the above information processing device, the display control unit may be configured to cause the display unit to display the visual information based on a predetermined operation by a user including the driver.

With the above information processing device, it is possible to switch the display of the visual information as desired.

In the above information processing device, the predetermined operation may be at least one of an operation to depress or touch a predetermined button, an accelerator operation, and a brake operation.

With the above information processing device, it is possible to switch the display of the visual information with a simple operation.

In the above information processing device, the display control unit may be configured to cause the display unit to display the visual information based on an obstacle being detected around the vehicle.

With the above information processing device, it is possible to display the visual information without the need for the driver to perform an operation.

In the above information processing device, the display control unit may be configured to change a manner of displaying the visual information based on a positional relationship between an obstacle detected around the vehicle and the expected passage paths.

With the above information processing device, it is possible to display information that reflects the risk of contact with the obstacle, etc.

In the above information processing device, the display control unit may indicate an expected passage path of a front tire and an expected passage path of a rear tire as a part of the visual information when a steering angle of the vehicle is equal to or greater than a predetermined angle.

With the above information processing device, the driver can grasp the expected passage path of the rear tire, making it easier to avoid the rear tire running onto an object, etc., because of the difference between tracks followed by the front and rear inner wheels during a right turn or a left turn, etc.

In the above information processing device, the display control unit may be configured to cause the display unit to display information that indicates a vehicle width of the vehicle, in addition to the visual information.

With the above information processing device, it is easier to avoid contact with the obstacle, etc.

In the above information processing device, the display unit may be any of a head-up display that projects information onto a windshield of the vehicle, a display monitor mounted on the vehicle, a terminal device carried by a user of the vehicle, and a head-mounted display worn by the driver.

With the above information processing device, the visual information can be provided to the driver in various manners.

An aspect of the present disclosure also provides a vehicle including: the above information processing device; and a display unit disposed in a field-of-view region of a driver.

With the above vehicle, the expected passage paths of the tires can be displayed on the display unit, helping the driver grasp the positions of passages of the tires of the vehicle.

The above vehicle may further include a detection unit configured to detect an obstacle around the vehicle, and the display control unit may be configured to cause the display unit to display the visual information based on information on the obstacle detected by the detection unit.

With the above vehicle, it is possible to make display in consideration of the position of the vehicle relative to the obstacle, etc.

The above vehicle may further include a detection unit configured to detect an obstacle around the vehicle, and the display control unit may be configured to change a manner of displaying the visual information based on a positional relationship between the obstacle detected by the detection unit and the expected passage paths.

With the above vehicle, it is possible to make display in consideration of the position of the expected passage paths of the tires of the vehicle relative to the obstacle, etc.

An aspect of the present disclosure further provides an information processing method including: specifying expected passage paths of two or more tires of a vehicle; and displaying visual information including the expected passage paths on a display unit disposed in a field-of-view region of a driver that drives the vehicle.

In the above information processing method, the expected passage paths of the tires can be displayed on the display unit, helping the driver grasp the positions of the tires of the vehicle.

An aspect of the present disclosure further provides a program that causes a processor of a computer to perform processing including: specifying expected passage paths of two or more tires of a vehicle; and displaying visual information including the expected passage paths on a display unit disposed in a field-of-view region of a driver that drives the vehicle.

An aspect of the present disclosure further provides a non-transitory storage medium storing instructions that are executable by one or more processors and that cause the one or more processors to perform functions including: specifying expected passage paths of two or more tires of a vehicle; and displaying visual information including the expected passage paths on a display unit disposed in a field-of-view region of a driver that drives the vehicle.

In the above program or the above non-transitory storage medium, the expected passage paths of the tires can be displayed on the display unit, helping the driver grasp the positions of the tires of the vehicle.

According to the present disclosure, it is possible to provide an information processing device, a vehicle, an information processing method, a program, and a non-transitory storage medium capable of supporting drive by a driver.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
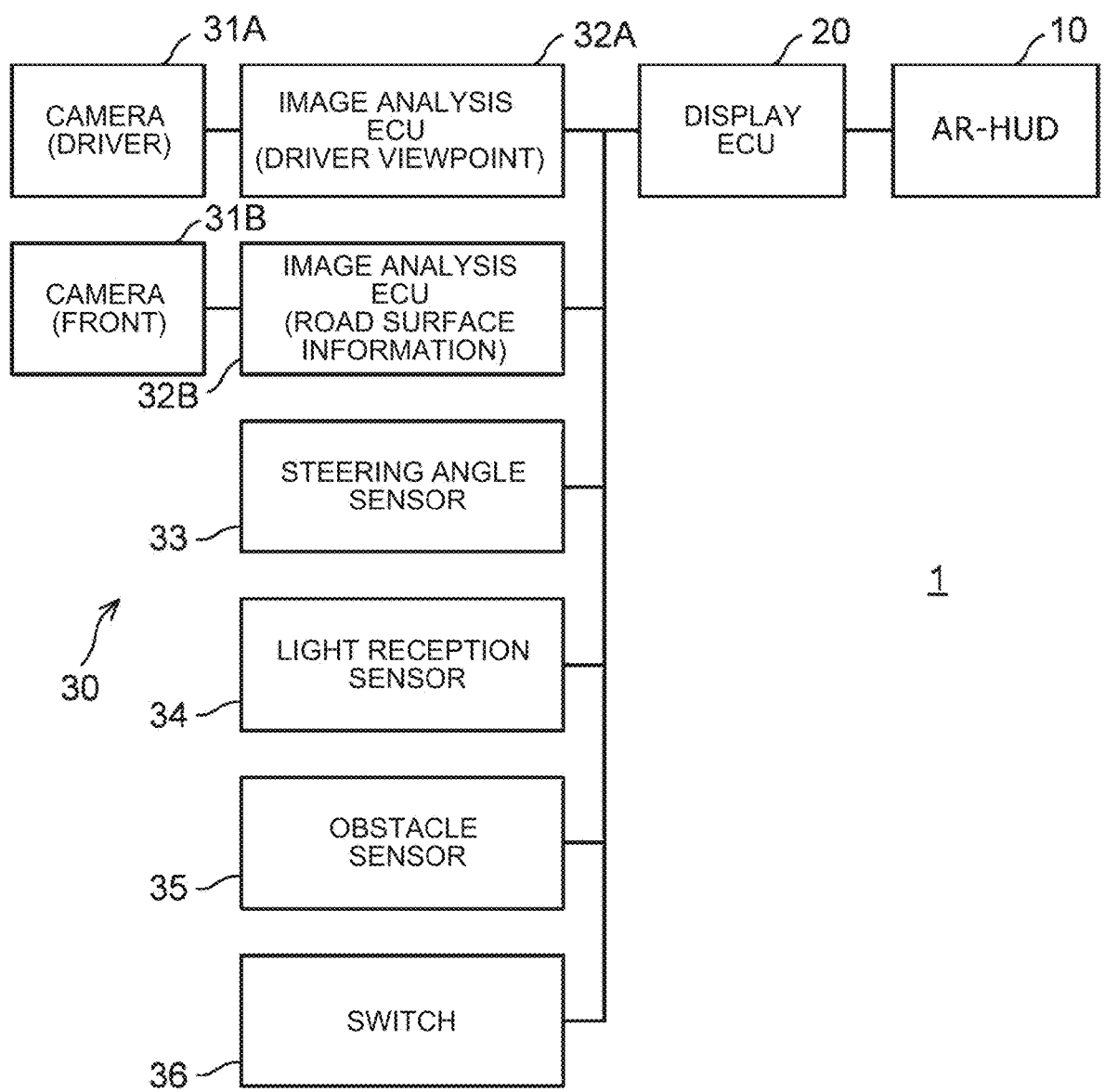
FIG. 1 is a block diagram schematically illustrating an example of the configuration of an information processing device according to an embodiment of the present disclosure.

An embodiment for carrying out the present disclosure will be described below with reference to the drawings. In the following, the scope of explanation necessary to achieve the object of the present disclosure will be described schematically, and the scope of explanation necessary to describe the relevant portion of the present disclosure will be mainly described. The parts where explanation is omitted are based on publicly known techniques. In the drawings, identical or corresponding members are designated by the same or similar reference signs, and duplicate explanations will be omitted. When a plurality of identical or corresponding members is included in the drawings, only some of such members may be given reference signs in order to make the drawings easier to view.

Figure 2:
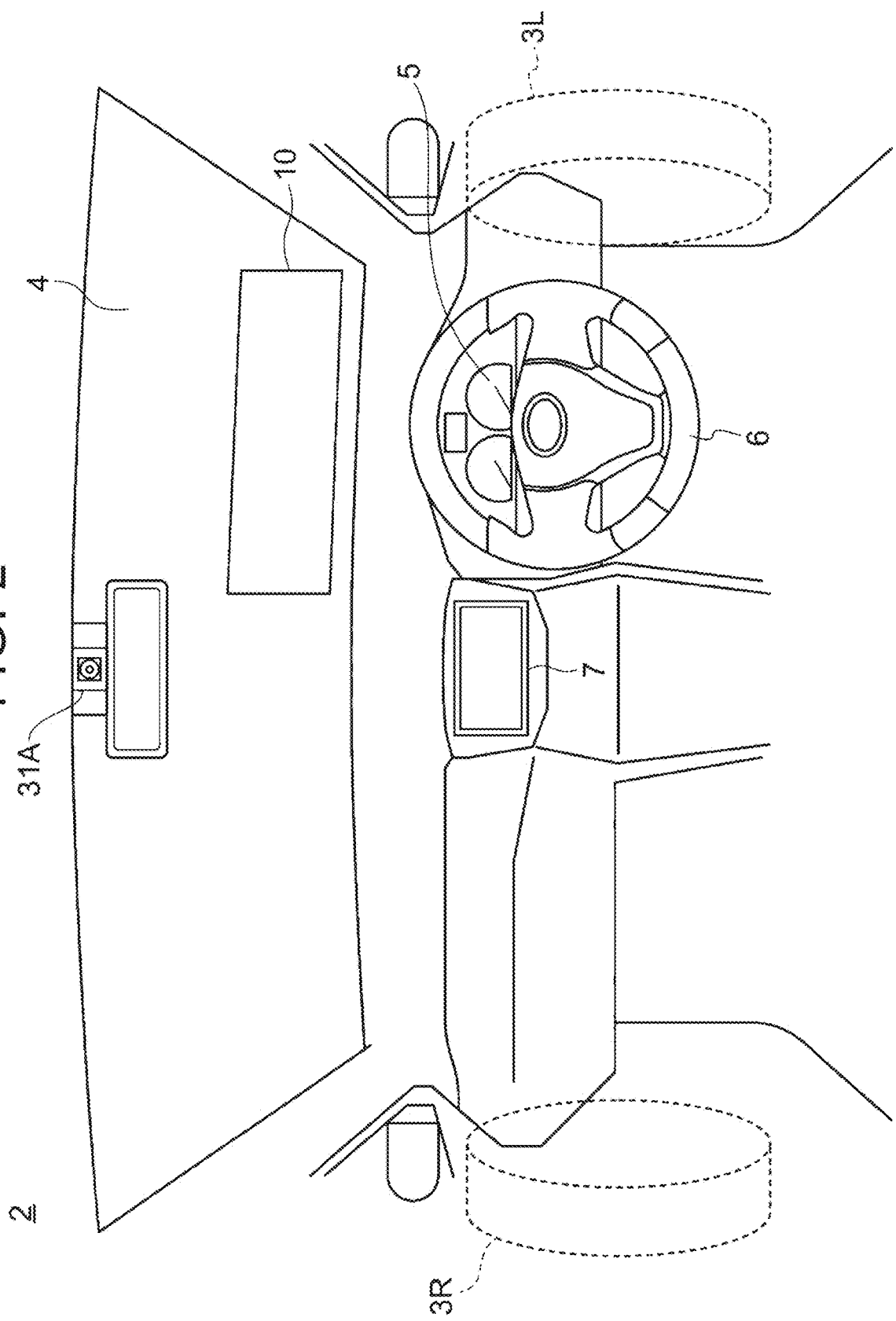
FIG. 2 is a schematic view illustrating an example of a main part of a vehicle according to the embodiment of the present disclosure.

FIG. 1 is a block diagram schematically illustrating an example of the configuration of an information processing device according to an embodiment of the present disclosure. FIG. 2 is a schematic view illustrating an example of a main part of a vehicle according to the embodiment of the present disclosure. An information processing device 1 according to the present embodiment can be mounted on a vehicle 2 as illustrated in FIG. 2, and provides a driver with information for supporting drive based on information detected by various sensors, etc. As illustrated in FIG. 2, a vehicle 2 may be a passenger vehicle that includes four tires 3R, 3L arranged at at least end portions in the vehicle width direction (right and left end portions in FIG. 2), for example, and a windshield (in other words, a windscreen) 4 in front of a vehicle cabin. Of the four tires, only two front tires are illustrated in FIG. 2.

As illustrated in FIG. 1, the information processing device 1 includes at least a display electronic control unit (ECU) 11 as an example of a display control unit that causes an augmented reality head-up display (AR-HUD) 10 to display predetermined information. The AR-HUD is an example of a display unit disposed in a field-of-view region of a driver that drives the vehicle 2. The field-of-view region of the driver discussed above is not specifically limited as long as the driver can visually recognize the region during drive, and may refer to a region ahead of the vehicle cabin including the windshield 4 and an instrument panel 5, for example.

The AR-HUD 10 is a head-up display mounted on the vehicle 2 and capable of projecting a variety of information onto at least a part of the windshield 4 of the vehicle 2. The information displayed on the AR-HUD 10 may be displayed as superimposed on a road, etc., that is visually recognizable from a driver's seat and that is to be traveled by the vehicle 2.

While the AR-HUD 10 is employed as a display unit in the present embodiment, the specific structure of the display unit is not limited thereto. Specifically, the display unit may be any of a display monitor (e.g., a liquid crystal monitor attached to the instrument panel 5 or a car navigation system) mounted on the vehicle 2, a terminal device (e.g., a smartphone (not illustrated)) carried by a user of the vehicle 2 such as the driver, and a head-mounted display (e.g., smartglasses (not illustrated)) worn by the driver, for example. When the display monitor mounted on the vehicle 2 discussed above is used as the display unit, visual information to be discussed later, etc., is preferably displayed as superimposed on an image of a scene ahead of the vehicle 2 on the display monitor.

Figure 3:
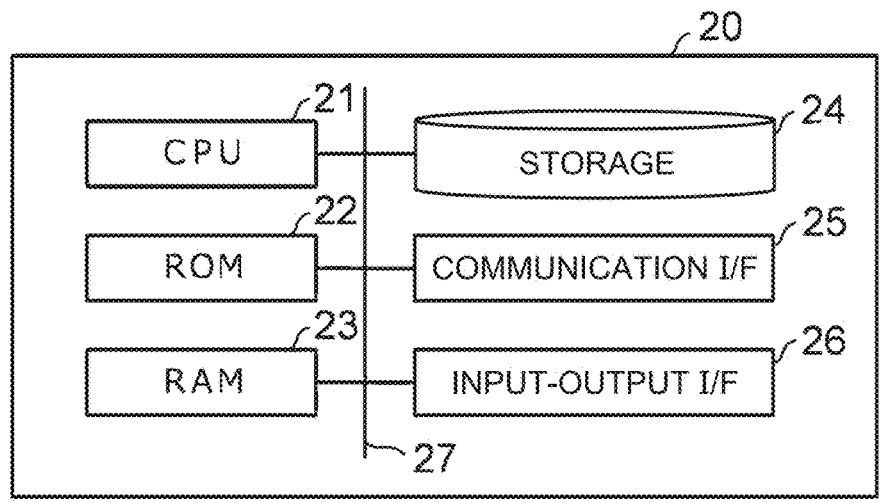
FIG. 3 is a block diagram illustrating an example of the hardware configuration of a display ECU illustrated in FIG. 1.

FIG. 3 is a block diagram illustrating an example of the hardware configuration of a display ECU illustrated in FIG. 1. The display ECU 20 controls a display content to be displayed on the AR-HUD 10. As illustrated in FIG. 3, the display ECU 20 can be constituted by a computer that includes a microcontroller. The computer may include a central processing unit (CPU) 21 as an example of a processor, a read only memory (ROM) 22 and a random access memory (RAM) 23 as an example of a memory, a storage 24, a communication interface 25, and an input-output interface 26. These components may be connected so as to be communicable with each other via an internal bus 27.

The CPU 21 may be a central processing unit capable of executing various programs and controlling various units. Specifically, the CPU 21 may be capable of reading a variety of programs stored in the ROM 22 or the storage 24 and executing the programs using the RAM 23 a work area. The CPU 21 may be capable of controlling constituent elements that constitute the information processing device 1 and performing various arithmetic processes according to the programs.

The ROM 22 may be capable of storing various programs and various data. The RAM 23 may be capable of temporarily storing programs or data as a work area.

The storage 24 can be constituted by a storage medium such as a hard disk drive (HDD), a solid state drive (SSD), and a flash memory. The storage 24 may store various programs including an operating system and various data that are necessary to cause the information processing device 1 to operate. In the present embodiment, the ROM 22 or the storage 24 may store a program for displaying desired information on the AR-HUD 10 and various data.

The storage 24 according to the present embodiment may store vehicle information about the vehicle 2 and parameters associated with display on the AR-HUD 10, in order to generate visual information to be discussed later. The vehicle information may include information on the vehicle width of the vehicle 2 and information on the positions of the tires. The parameters may include information on the width of the tires, the height of the bottom surface of the vehicle body during travel, etc. While the information on the width of the tires can be the width of tires (occasionally called "genuine tires") attached to the vehicle 2 at the time of factory shipping, for example, the information may be set by a user, etc., at a desired timing such as when replacing the tires. Alternatively, the width of the tires can be specified by attaching a camera, etc., at an appropriate location in a wheel housing. The information on the height of the bottom surface of the vehicle body during travel also may be the height at the time of factory shipping, or can be set by a user, etc., at a desired timing, as with the information on the width of the tires discussed above.

The communication interface (I/F) 25 may be an interface that enables wireless communication to allow the information processing device 1 to communication with a server computer, various databases, a terminal device of a user, etc., via a network, etc. The communication interface 25 may employ a communication standard such as controller area network (CAN), Ethernet (registered trademark), long term evolution (LTE), fiber distributed data interface (FDDI), or Wi-Fi (registered trademark).

The input-output interface (I/F) 26 may be an interface that is used to transmit and receive data, etc., to and from various constituent elements that are necessary for display control and mainly mounted on the vehicle 2. The constituent elements electrically connected to the input-output interface 26 may be selected as appropriate. The input-output interface 26 according to the present embodiment acquires various information from sensors 30 such as a steering angle sensor 33, and outputs a generated display image to the AR-HUD 10, as illustrated in FIG. 1.

The sensors 30 may be constituent elements that are mounted on the vehicle 2 and that are capable of acquiring information that is necessary for the display position 20 to generate a display screen to be displayed on the AR-HUD 10, for example. Specifically, the sensors 30 may include a camera 31A, a camera 31B, a steering angle sensor 33 that detects a steering angle of the vehicle 2, a light reception sensor 34 that detects the brightness outside the vehicle 2, an obstacle sensor 35, and a switch 36. The camera 31A is a camera installed at a predetermined position (e.g., a position at which a rearview mirror is installed) in the vehicle 2 to detect either the head position or the viewpoint of the driver. The camera 31B is a camera installed at a front part of the vehicle 2 to detect road surface information on a road surface being traveled by the vehicle 2. The obstacle sensor 35 is an example of a detection unit that detects an obstacle around the vehicle 2. The switch 36 is a switch that is used to operate an image displayed on the AR-HUD 10. The constituent elements included in the sensors 30 are not limited to those described above. Thus, the sensors 30 may further include other sensors not discussed above, or one or more of the constituent elements discussed above may be omitted in a range in which the function of the information processing device 1 may be maintained. The other sensors discussed above can include a vehicle speed sensor that detects the speed of the vehicle 2, a gyro sensor that detects the attitude, etc., of the vehicle, etc.

The camera 31A may acquire an image (hereinafter referred to as a "face image") of a face of the driver. The camera 31A may be connected to an image analysis ECU 32A. The camera 31A may be a well-known image sensor such as a charge coupled device (CCD) or complementary metal oxide semiconductor (CMOS) image sensor.

The image analysis ECU 32A specifies at least one of the head position and the viewpoint of the driver from the face image captured by the camera 31A. In the present embodiment, the image analysis ECU 32A may estimate the viewpoint (or the line of sight) of the driver from the face image acquired by the camera 31A. By way of example, the viewpoint of the driver may be estimated from the positional relationship of eyelids and pupils of both eyes in the face image. The information about the estimated viewpoint of the driver is output from the image analysis ECU 32A to the display ECU 20. The display ECU 20 adjusts the position of display on the AR-HUD 10 based on the information about the viewpoint of the driver input from the image analysis ECU 32A.

The camera 31B may acquire an image of a scene ahead of the vehicle. The camera 31B may be connected to an image analysis ECU 32B. The camera 31B also may be a well-known image sensor such as a CCD or CMOS image sensor, as with the camera 31A.

The image analysis ECU 32B analyzes the image of the scene ahead of the vehicle captured by the camera 31B, and detects road surface information such as white lines on the road and boundary lies between the road and areas outside the road. Additionally, the image analysis ECU 32B according to the present embodiment estimates a position of the vehicle 2 in the road width direction on the road on which the vehicle 2 is traveling. The detected road surface information and information on the position of the vehicle in the road width direction on the road are output from the image analysis ECU 32B to the display ECU 20. The display ECU 20 generates data on visual information to be displayed on the AR-HUD 10 based on the road surface information and the information on the position of the vehicle in the road width direction on the road input from the image analysis ECU 32B and information input from the steering angle sensor 33, the obstacle sensor 35, etc., to be discussed later.

The image analysis ECUs 32A, 32B can be constituted by a computer, as with the display ECU 20, and may execute a predetermined arithmetic process based on a predetermined program. While the image analysis ECUs 32A, 32B and the display ECU 20 are illustrated as separate constituent elements in FIG. 1, the ECUs may be at least partially constituted integrally. The display ECU 20 and the AR-HUD 1 also may be at least partially constituted integrally.

The steering angle sensor 33 is a sensor capable of detecting a steering angle of a steering wheel 6 of the vehicle 2. The steering angle sensor 33 may be a sensor capable of detecting a steering angle of steered wheels (e.g., tires 3R, 3L) of the vehicle 2, instead of the steering angle of the steering wheel 6.

The light reception sensor 34 is a sensor capable of detecting the brightness outside the vehicle, and can be constituted by an illuminance sensor that uses a photodiode or a phototransistor, for example.

The obstacle sensor 35 can be constituted by a millimeter wave radar, a light detection and ranging (LIDAR), and a sonar, for example. The millimeter wave radar emits a millimeter wave forward or laterally forward from the vehicle, receives a radio wave reflected from an object, and measures a distance to an obstacle, etc., and relative speeds of the vehicle and the obstacle, etc., based on a propagation time, a frequency difference caused by the Doppler effect, etc. The LIDAR detects an obstacle, etc., from scattered light of a pulsed later radiated around the vehicle, by way of example. The sonar detects an obstacle, etc., using the difference in reflectivity of an ultrasonic wave radiated around the vehicle, by way of example. The obstacle sensor 35 more preferably employs a sensor capable of detecting the height of the obstacle. The obstacle sensor 35 may be omitted.

The switch 36 may be installed at a desired position of the vehicle 2, for example, around the driver's seat, and capable of switching display on the AR-HUD 10. The switch 36 can be a push button switch, a touch sensor, etc. When the switch 36 according to the present embodiment is depressed or touched, display of the visual information generated by the display ECU 20 on the AR-HUD 10 can be turned on and off.

While the content of display on the AR-HUD 10, more specifically, display of the visual information, can be switched on and off using the switch 36 in the present embodiment, the present disclosure is not limited thereto. Specifically, display of the visual information can be controlled on and off by a method that is different from the method in which the switch 36 is used discussed above. Specifically, display of the visual information on the AR-HUD 10 may be turned on and off when a predetermined accelerator operation or brake operation is performed, or may be turned on when the obstacle sensor 35 detects an obstacle, or the switching methods discussed above may be employed in combination. Alternatively, display of the visual information may always be turned on while the AR-HUD 10 is in operation. The predetermined accelerator operation discussed above may be an operation in which the amount of depression of an accelerator pedal reduces by a predetermined amount, for example. The predetermined brake operation may be an operation in which a brake pedal is depressed by a predetermined amount.

While display of the visual information is switched on and off by a depression or touch operation of the switch 36 in the example discussed above, this is not limiting. Specifically, display of the visual information may be turned on for a certain time when a depression or touch operation of the switch 36 is performed, and display of the visual information may be automatically turned off after the lapse of the certain time. Such operation to turn on only for the certain time can be similarly employed when the other methods discussed above (specifically, the method based on a predetermined accelerator operation and brake operation and the method based on detection of an obstacle) are employed instead of the method based on the switch 36.

When an obstacle of various kinds including objects such as falling objects and road crack and damage is present on a path, specifically, a road, on which the vehicle 2 is to travel, for example, it is necessary for the driver to avoid a collision with the obstacle by operating the vehicle 2. For example, when the obstacle is a dent such as a crack in the road or an object with a low height (specifically, with a height lower than that of the bottom surface of the vehicle body) and the road is relatively narrow, one method is to avoid a collision of the vehicle 2 by letting the obstacle pass under between the right and left tires. In order to let the obstacle to pass under between the right and left tires, it is necessary for the driver to grasp the positions of the right and left tires. However, it is often more difficult, particularly for drivers that are not good at driving, etc., to grasp the positions of the tires than to grasp the vehicle width. Additionally, similarly to the above, it may be more important to grasp the positions of the right and left tires of the vehicle 2 than to grasp the vehicle width, in order to allow the vehicle, traveling on a road provided with a gutter at an end portion in the width direction or a road that is adjacent to a cliff, to travel without deviating from the road.

In consideration of the above, the information processing device 1 according to the present embodiment configured as discussed above employs a structure to inform the driver of the positions of the right and left tires 3R, 3L of the vehicle 2 by the display ECU 20 generating visual information to be displayed on the AR-HUD 10 based on the information input from the sensors 30. The visual information generated by the display ECU 20 will be described below.

Figure 4:
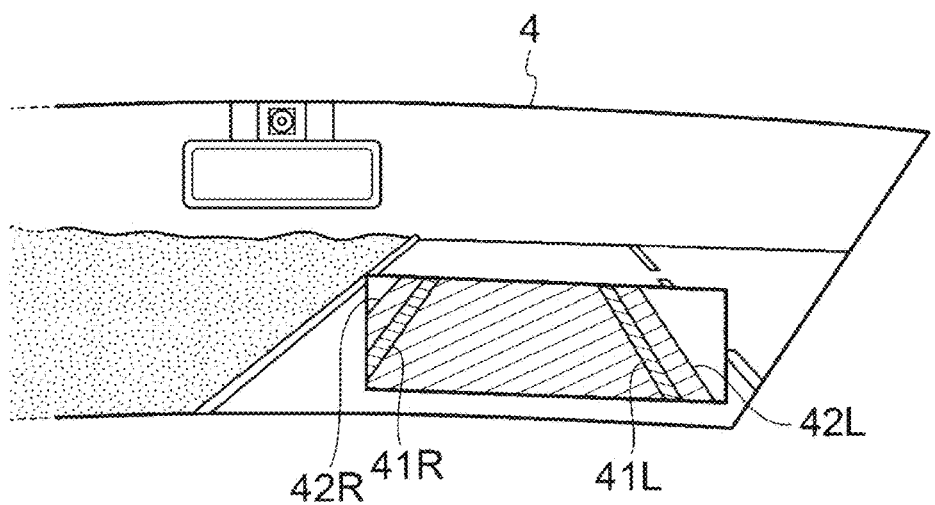
FIG. 4 illustrates an example of a display screen of an augmented reality head-up display (AR-HUD)

FIG. 4 illustrates an example of a display screen of the AR-HUD. The display ECU 20 according to the present embodiment generates visual information to be displayed on the AR-HUD 10 when the switch 36 is depressed or touched during travel of the vehicle 2, for example. At this time, the display ECU 20 acquires the road surface information and the result of estimating the position of the vehicle 2 in the road width direction on the road on which the vehicle 2 is traveling from the image analysis ECU 32 connected to the camera 31B that captures at least an image of a scene ahead of the vehicle 2. Then, the display ECU 20 calculates expected passage paths of the right and left tires (more specifically, front tires) 3R, 3L using the acquired information and the parameters stored in the storage 24. The calculated expected passage paths are output to the AR-HUD 10 as visual information, and displayed on the AR-HUD 10 as tire passage lines 41R, 41L as illustrated in FIG. 4.

The tire passage lines 41R, 41L displayed on the AR-HUD 10 are preferably adjusted in size in the width direction based on the width of the tires stored in the storage 24. If the tire passage lines 41R, 41L reflect the information on the width of the tires attached to the vehicle 2, the driver can grasp the travel paths of the tires 3R, 3L more accurately. When there is no information about the width of the tires in the storage 24, for example, the tire passage lines 41R, 41L may be generated with a width set by default.

In the present embodiment, as illustrated in FIG. 4, vehicle width lines 42R, 42L are preferably displayed on the AR-HUD 10 in addition to the tire passage lines 41R, 41L. The vehicle width lines 42R, 42L can be specified by the display ECU 20 through calculation mainly based on the result of estimating the position of the vehicle 2 in the road width direction acquired from the image analysis ECU 32B, the information on the vehicle width of the vehicle stored in the storage 24, and the detection result from the steering angle sensor 33. The vehicle width lines 42R, 42L can be determined as lines that indicate positions obtained by projecting the outer edge portions of the vehicle 2 in the vehicle width direction onto the road surface in the advancing direction of the vehicle 2. By displaying the tire passage lines 41R, 41L and the vehicle width lines 42R, 42L as superimposed in this manner, the driver can precisely grasp both the vehicle width and the positions of the tires. By displaying the vehicle width lines 42R, 42L, the driver can easily avoid contact with a pedestrian, a bicycle, etc., passing through a side road. A region interposed between the vehicle width lines 42R, 42L is preferably displayed as colored as a region to be passed by the vehicle body, as illustrated in FIG. 4, allowing the driver to grasp the travel track of the vehicle 2.

The display ECU 20 preferably acquires and uses the steering angle detected by the steering angle sensor 33, in order to improve the precision in calculating expected passage paths. Highly precise expected passage paths that reflect the course of the vehicle 2 can be calculated when the steering angle is taken into consideration.

While the tire passage lines 41R, 41L based on the expected passage paths of the tires, particularly the front tires, are displayed in the embodiment discussed above, the present disclosure is not limited thereto. For example, when the steering angle detected by the steering angle sensor 33 and acquired by the display ECU 20 has become large since the vehicle 2 has made a right turn or a left turn, display of the tire passage lines 41R, 41L is preferably changed in consideration of a fact that the difference in the travel path due to the positions of the tires in the front-rear direction becomes large. Specifically, when the steering angle detected by the steering angle sensor 33 is more than a predetermined angle, the display ECU 20 may individually calculate expected passage paths of the front tires and expected passage paths of the rear tires. Then, the calculated expected passage paths of the front tires and expected passage paths of the rear tires are preferably displayed distinctively (e.g., in different colors) as tire passage lines on the AR-HUD 10. When the tire passage lines based on the expected passage paths of the front tires and the tire passage lines based on the expected passage paths of the rear tires are displayed on the AR-HUD 10 in this manner, the driver can grasp the expected passage paths of the rear tires. Thus, upon seeing such display, the driver can easily avoid running onto a side road, etc., because of the difference between tracks followed by the front and rear inner wheels caused during a right turn or a left turn.

The display ECU 20 preferably adjusts the brightness of an image displayed on the AR-HUD 10 using a detection result from the light reception sensor 34. In particular, when display is performed using the AR-HUD 10 as in the present embodiment, the AR-HUD 10 projects the visual information onto the windshield 4 to be displayed as superimposed on the scene ahead of the vehicle, and therefore the display content is occasionally assimilated with the scene and difficult to visually recognize. Thus, it is important to control display in consideration of the brightness around the vehicle 2, in order to reliably provide the driver with the visual information.

Figure 5:
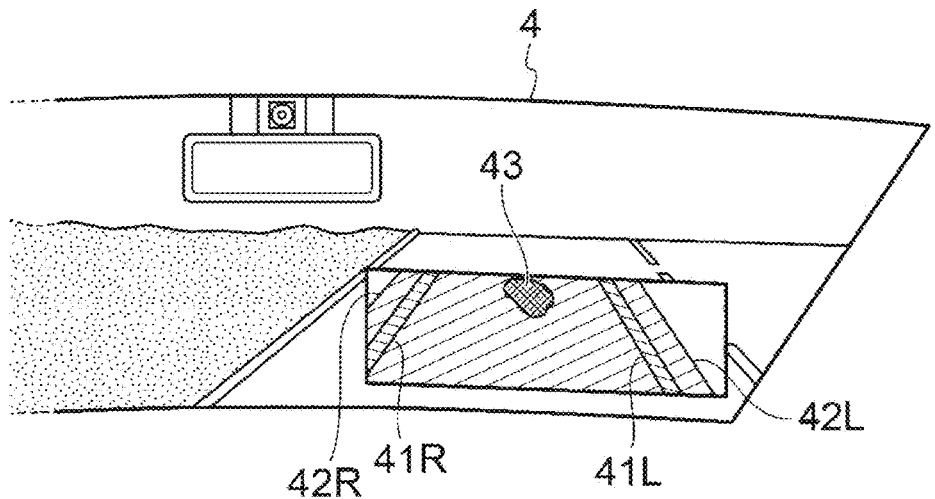
FIG. 5 illustrates another example of the display screen of the AR-HUD.

FIG. 5 illustrates another example of the display screen of the AR-HUD. The display ECU 20 preferably changes the visual information based on a detection result from the obstacle sensor 35. Specifically, when information indicating that an obstacle has been detected on the travel path of the vehicle 2 is input from the obstacle sensor 35, the display ECU 20 can prepare obstacle display 43 for informing the driver that an obstacle is present on the travel path, in parallel with calculating expected passage paths. The obstacle display 43 may be an image, for example. In the present embodiment, the obstacle display 43 is indicated as an image constituted of specific color information to be displayed as superimposed on the obstacle. When visual information including such color information is displayed on the AR-HUD 10, the color information is displayed as superimposed on the obstacle so that the driver visually recognizes the obstacle as being colored in a specific color as illustrated in FIG. 5. This allows the driver to be strongly impressed by the presence of the obstacle.

While the presence of the obstacle is highlighted by projecting an indication in the specific color so as to superposed on the obstacle in FIG. 5, the display ECU 20 can change the manner of display in consideration of information that can be acquired by the obstacle sensor 35 or the positional relationship between the obstacle and the expected passage paths. For example, when the obstacle sensor 35 can acquire information on the height of the obstacle, the display ECU 20 can specify whether the detected obstacle can pass under between the right and left tires by comparing such height information with the height of the bottom surface of the vehicle body during travel stored in the storage 24. Thus, the display ECU 20 can make different display, for example, different obstacle display, according to whether the obstacle on the course can pass under between the right and left tires. Such obstacle display may be projected in a color that makes the driver less wary of the obstacle, such as blue, when the obstacle can pass under between the right and left tires, and conversely may be projected in a color that makes the driver wary of the obstacle, such as red, when the obstacle cannot pass under between the right and left wheels, for example. However, this is not limiting. For example, the driver may be informed by displaying a text indicating whether the obstacle can pass under between the right and left tires, or using voice in addition to display. By employing such display, the driver can immediately grasp how to avoid the obstacle on the course.

The display ECU 20 can also change display based on the positional relationship between the obstacle and the expected passage paths, more specifically, whether the obstacle acquired by the obstacle sensor 35 is superposed on the expected passage paths calculated by the display ECU 20. Such display may be projected in a color that makes the driver wary of the obstacle, such as yellow, when the obstacle and the expected passage paths are superposed on each other, and conversely may be projected in a color that makes the driver less wary of the obstacle, such as white, when the obstacle and the expected passage paths are not superposed on each other, for example. However, this is not limiting. By changing display based on the positional relationship between the obstacle and the expected passage paths in this manner, the driver can execute an early operation to avoid a collision with the obstacle.

The display ECU 20 preferably adjusts the position of display of a visual image on the AR-HUD 10 by acquiring or specifying the viewpoint of the driver from the image analysis ECU 32A connected to the camera 31A that captures an image of the face of the driver. The adjustment of the position of the visual image discussed above is particularly effective when a display unit of a type that displays an image to be displayed as superposed on the actual scene, such as the AR-HUD 10 and the head-mounted display discussed above, is employed. By adjusting the display position, it is possible to suppress deviation of the positions of the tire passage lines 41R, 41L and the vehicle width lines 42R, 42L from the actual expected passage paths and vehicle width positions due to displacement of the head portion or the viewpoint of the driver. This suppresses the driver erroneously recognizing the positions of passage of the tires or the vehicle width.

As described above, with the information processing device 1 according to the present embodiment and the vehicle 2 including the information processing device 1, the driver can be assisted in grasping the positions of passage of the tires by displaying the tire passage lines 41R, 41L on the AR-HUD 10 as visual information corresponding to the expected passage paths of the tires. Thus, it is possible to support the driver in operation to avoid an obstacle, etc.

Next, an information processing method according to the present embodiment will be described. The following describes, as an example, a case where the information processing method according to the present embodiment is implemented in the vehicle 2 including the information processing device 1 discussed above. The information processing method to be described below may be implemented by executing a program that causes at least one processor 21 of a computer that constitutes the information processing device 1 to execute predetermined operation. This program may be stored in a storage unit such as the ROM 22 and the storage 24, or may be provided in the form of a non-transitory computer-readable storage medium.

The information processing method according to the present embodiment includes at least a step of specifying expected passage paths of the tires 3R, 3L of the vehicle 2 (corresponding to steps S08 and S09 to be discussed later) and a step of displaying visual information including the expected passage paths on the AR-HUD 10 disposed in the field-of-view region of the driver that drives the vehicle 2 (corresponding to step S15 to be discussed later). A specific example will be described below. In the specific example to be described below, it is assumed that the switch 36 has been depressed, that is, generation of visual information by the display ECU 20 has been turned on.

Figure 6:
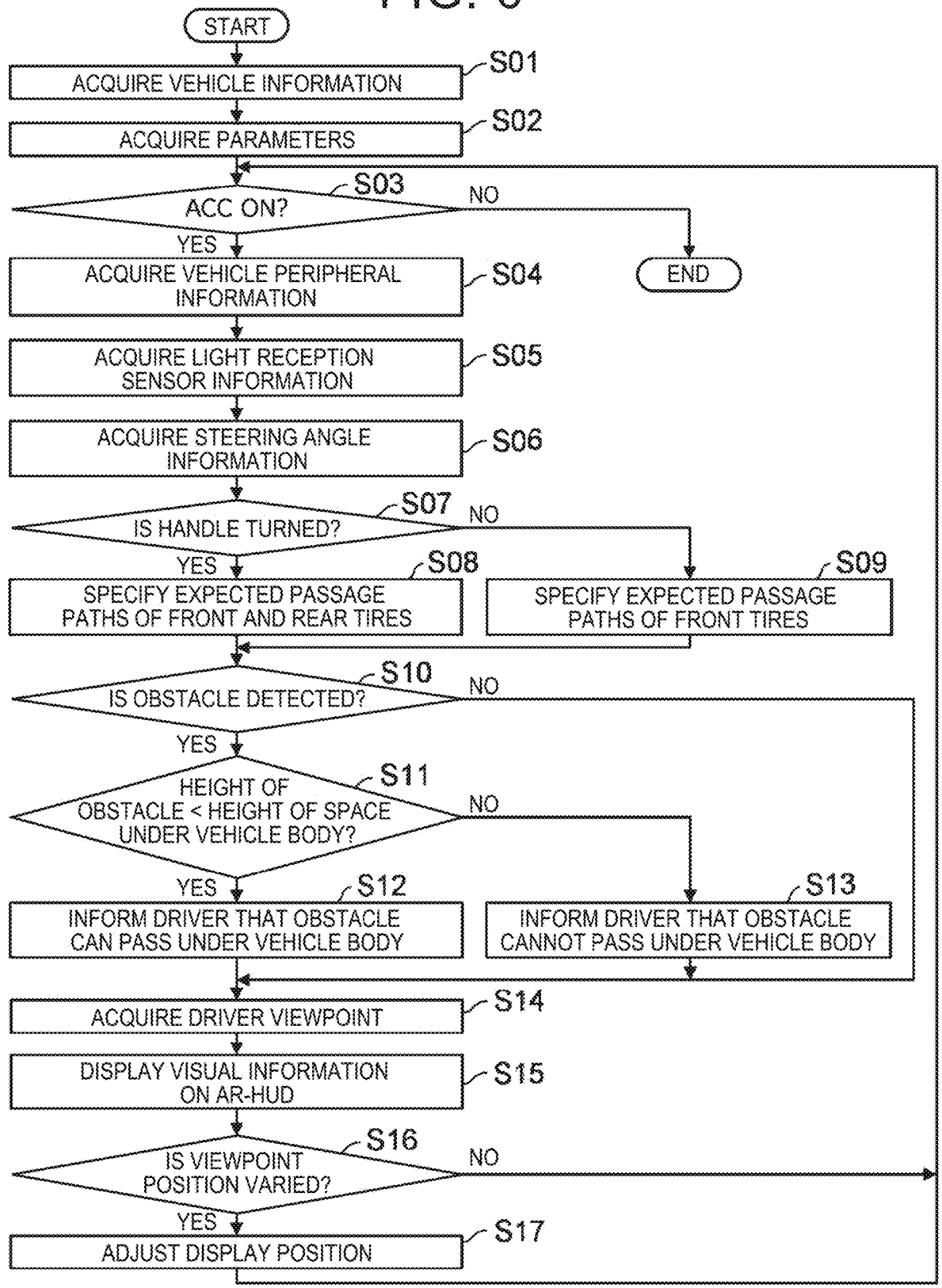
FIG. 6 is a flowchart illustrating an example of an information processing method according to the embodiment of the present disclosure.

FIG. 6 is a flowchart illustrating an example of the information processing method according to the embodiment of the present disclosure. The information processing method according to the present embodiment is started when the power supply for the vehicle 2 is brought to an accessory (ACC)-on or ignition (IG)-on state. When the information processing method is started, the display ECU 20 acquires vehicle information (step S01). The vehicle information includes information on the vehicle width of the vehicle 2 and information on the positions of the tires 3R, 3L with respect to the vehicle body, and is stored in advance in the storage 24 of the display ECU 20.

The display ECU 20 acquires parameters associated with display on the AR-HUD 10 (step S02). These parameters include information on the width of the tires 3R, 3L of the vehicle 2 and the height of the space under the vehicle body, and are stored in advance in the storage 24 of the display ECU 20, as with the vehicle information.

Next, it is determined whether the power supply for the vehicle 2 is in the ACC-on or IG-on state (step S03). When in the ACC-off (and IG-off) state as a result of this determination (NO in step S03), the process is ended.

When in the ACC-on or IG-on state in step S03, the display ECU 20 starts generation of visual information. Specifically, first, the sensors 30 are activated to acquire vehicle peripheral information (step S04). The vehicle peripheral information includes road surface information and a result of estimating the position of the vehicle 2 in the road width direction on the road on which the vehicle 2 is traveling, acquired from the image analysis ECU 32B connected to the camera 31B, and a detection result from the obstacle sensor 35, for example. The acquired vehicle peripheral information is analyzed by the display ECU 20, and used to calculate expected passage paths of the tires and specify the presence or absence of an obstacle.

Next, the display ECU 20 acquires a detection result from the light reception sensor 34 (step S05), and determines the brightness of the display screen of the AR-HUD 10.

Further, the display ECU 20 acquires a detection result from the steering angle sensor 33 (step S06). The steering angle as the detection result from the steering angle sensor 33 is used to calculate expected passage paths of the tires, etc. (more specifically, calculate the rate of curve of the tire passage lines 41R, 41L and the vehicle width lines 42R, 42L). The steering angle is also used to determine whether the steering wheel (handle) 6 is turned by the driver by a predetermined steering angle or more (step S07), in other words, whether the vehicle 2 is making a right or left turn.

When the display ECU 20 detects from the detection result acquired from the steering angle sensor 33 that the steering angle is small, that is, the handle is not turned (No in step S07), the display ECU 20 specifies expected passage paths of the tires, particularly the front tires, through calculation (step S09). When it is detected from the detection result acquired from the steering angle sensor 33 that the handle is turned (Yes in step S07), on the other hand, the display ECU 20 also specifies expected passage paths of the rear tires, in addition to expected passage paths of the front tires, through calculation (step S08).

In order to display the specified expected passage paths on the AR-HUD 10, the display ECU 20 generates drawing information on the tire passage lines 41R, 41L that match the specified expected passage paths as a part of the visual information. The display ECU 20 also generates drawing information on the vehicle width lines 42R, 42L based on the vehicle information, as a part of the visual information, along with the generation of the drawing information on the tire passage lines 41R, 41L.

The display ECU 20 also determines whether there is an obstacle around the vehicle 2, specifically on the course of the vehicle 2, based on the detection result from the obstacle sensor 35 acquired by the display ECU 20 as a part of the vehicle peripheral information (step S10). Here, when it is determined that there is an obstacle (Yes in step S10), generation of visual information for avoiding a collision with the obstacle is started. When it is determined that there is no obstacle (No in step S10), on the other hand, the process proceeds to step S14 to be discussed later.

When it is determined that there is an obstacle on the course of the vehicle 2, the display ECU 20 determines whether the obstacle is sized so as to be able to pass under between the right and left tires. Specifically, the display ECU 20 determines whether the height of the obstacle detected by the obstacle sensor 35 is less than the height of the space under the vehicle body acquired as a parameter (step S11). When the height of the obstacle is less than the height of the space under the vehicle body as a result of the determination, the display ECU 20 informs the driver that this obstacle can pass under between the right and left tires (step S12). When the height of the obstacle is more than the height of the space under the vehicle body, on the contrary, the display ECU 20 informs the driver that this obstacle cannot pass under between the right and left tires (step S13).

A variety of methods are conceivable as a method of informing the driver in steps S12 and S13 discussed above. In specific examples, the driver may be informed using a voice message, or drawing information on the obstacle display 43 that reflects the content of information and/or drawing information on a text corresponding to the content of information may be generated and displayed on the AR-HUD 10 as a part of the visual information in step S15 to be discussed later.

While a process in which the driver is informed based on whether the obstacle can pass under between the right and left tires is specifically described in the example discussed above, the action to be taken by the display ECU 20 when an obstacle is detected is not limited thereto. For example, when it is detected that the obstacle is so large that a collision with the vehicle 2 is unavoidable, it is possible to execute a process of informing the driver of the detection of such an obstacle. When the obstacle is a gutter, a crack formed in the road, etc., and a risk of a tire going into the gutter or the crack is detected, it is possible to execute a process of informing the driver of such a risk.

After visual information including expected passage paths of the tires is generated through the series of processes discussed above, the display ECU 20 executes a process of displaying the generated visual information on the AR-HUD 10. Specifically, the display ECU 20 first acquires a viewpoint of the driver (step S14). The viewpoint of the driver acquired here may be the viewpoint estimated by the image analysis ECU 32A from the face image of the driver captured by the camera 31A. Next, the display ECU 20 lays out the various visual information generated, etc., according to the viewpoint of the driver, and outputs the resulting information to the AR-HUD 10. This allows the visual information to be displayed on the AR-HUD 10 (step S15).

The display ECU 20 also monitors variations in position of the viewpoint of the driver (step S16). When it is detected that the viewpoint of the driver has been varied (Yes in step S16) as a result of the driver moving his/her head portion, etc., the display ECU 20 adjusts the position at which the visual information is displayed (step S17). When a predetermined time elapses without detecting variations in position of the viewpoint (No in step S16), or with adjustment of the display position, after the visual information is displayed on the AR-HUD 10, the display ECU 20 returns to step S03 to execute the series of steps again, in order to update the display image.

By executing the series of steps discussed above, the display ECU 20 displays the visual information including the tire passage lines 41R, 41L on the AR-HUD 10. Upon seeing such display, the driver can continue travel while accurately grasping the positions of passage of the tires 3R, 3L of the vehicle 2. Thus, the driver can easily avoid a collision with an object on the course, a tire going into a gutter, etc.

While the information processing method according to the present embodiment is executed using the information processing device 1 that includes the obstacle sensor 35 in the above embodiment, the information processing method can also be executed using an information processing device that does not include the obstacle sensor 35. In that case, steps S10 to S13 discussed above are omitted. The information processing method according to the present embodiment can also be executed using an information processing device that includes an obstacle sensor capable of detecting the presence of an obstacle but incapable of detecting the height of the obstacle. In that case, when an obstacle is detected in step S10, a step of generating visual information for informing the driver of the presence of the obstacle is preferably executed instead of steps S11 to S13 discussed above.

With the information processing device 1, the vehicle 2, the information processing method, and the program according to the present embodiment, as described above, the tire passage lines 41R, 41L can be displayed on the AR-HUD 10. Therefore, the risk of a tire running into a gutter, running onto an obstacle, etc., can be precisely communicated to the driver. Thus, it is possible to support the driver in driving safely.

While the effects for drivers that are not good at driving and drivers not accustomed to driving have been mainly described in relation to the above embodiment, the present disclosure is also advantageous in supporting drive by drivers that drive in motor sports and drivers that drive in fields other than roads, for example. For example, drift driving can be safely executed by grasping expected passage paths including the width of the tires of the vehicle during drive in motor sports such as rallies and dirt trials. Meanwhile, the occurrence of a flat tire, etc., due to a tire running into a gutter or running onto an obstacle can be easily avoided by grasping expected passage paths including the width of the tires of the vehicle during travel on a rough road such as rocky terrain.

In the above embodiment, the term "processor" refers to a processor in a broad sense, and includes a general-purpose processor (e.g., the CPU 21 discussed above) and a dedicated processor (e.g., a graphics processing unit (GPU), an application specific integrated circuit (ASIC), a field programmable gate array (FPGA), a programmable logic device, etc.).

The operation of the processor in the above embodiment may be performed not only by a single processor, but also by a plurality of processors physically located away from each other cooperating with each other. The order of operations of the processor is not limited to the order described in relation to the above embodiment, and may be changed as appropriate.

The present disclosure is not limited to the embodiment discussed above, and a variety of modifications can be made without departing from the spirit and scope of the present disclosure. All such modifications should be included in the technical concept of the present disclosure.

What is claimed is:

1. An information processing device comprising:
    a display control unit configured to cause a display unit disposed in a field-of-view region of a driver that drives a vehicle to display visual information including expected passage paths of two or more tires of the vehicle,
    wherein the visual information further includes information about widths of the two or more tires.

2. The information processing device according to claim 1, wherein the display control unit is configured to cause the display unit to display, as part of the visual information, the expected passage paths specified based on information about a steering angle of the vehicle.

3. The information processing device according to claim 1, wherein the display control unit is configured to control a position of display of the visual information on the display unit based on at least one of a head position and a viewpoint of the driver.

4. The information processing device according to claim 1, wherein the display control unit is configured to cause the display unit to display the visual information based on a predetermined operation by a user including the driver.

5. The information processing device according to claim 4, wherein the predetermined operation is at least one of an operation to depress or touch a predetermined button, an accelerator operation, and a brake operation.

6. The information processing device according to claim 1, wherein the display control unit is configured to cause the display unit to display the visual information based on an obstacle being detected around the vehicle.

7. The information processing device according to claim 1, wherein the display control unit is configured to change a manner of displaying the visual information based on a positional relationship between an obstacle detected around the vehicle and the expected passage paths.

8. The information processing device according to claim 1, wherein the display control unit indicates an expected passage path of a front tire and an expected passage path of a rear tire as a part of the visual information when a steering angle of the vehicle is equal to or greater than a predetermined angle.

9. The information processing device according to claim 1, wherein the display control unit is configured to cause the display unit to display information that indicates a vehicle width of the vehicle, in addition to the visual information.

10. The information processing device according to claim 1, wherein the display unit is any of a head-up display that projects information onto a windshield of the vehicle, a display monitor mounted on the vehicle, a terminal device carried by a user of the vehicle, and a head-mounted display worn by the driver.

11. A vehicle comprising:
    the information processing device according to claim 1; and
    a display unit disposed in a field-of-view region of a driver.

12. The vehicle according to claim 11, further comprising a detection unit configured to detect an obstacle around the vehicle, wherein
    the display control unit is configured to cause the display unit to display the visual information based on information on the obstacle detected by the detection unit.

13. The vehicle according to claim 11, further comprising a detection unit configured to detect an obstacle around the vehicle, wherein
    the display control unit is configured to change a manner of displaying the visual information based on a positional relationship between the obstacle detected by the detection unit and the expected passage paths.

14. An information processing method comprising:
    specifying expected passage paths of two or more tires of a vehicle; and
    displaying visual information including the expected passage paths on a display unit disposed in a field-of-view region of a driver that drives the vehicle,
    wherein the visual information further includes information about widths of the two or more tires.

15. A non-transitory computer readable storage medium storing instructions that are executable by one or more processors and that cause the one or more processors to perform functions comprising:
    specifying expected passage paths of two or more tires of a vehicle; and
    displaying visual information including the expected passage paths on a display unit disposed in a field-of-view region of a driver that drives the vehicle,
    wherein the visual information further includes information about widths of the two or more tires.

* * * * *